United States Patent [19]

Arroyo

[11] Patent Number: 5,076,008

[45] Date of Patent: Dec. 31, 1991

[54] HORTICULTURAL FABRIC COVER

[75] Inventor: Candido J. Arroyo, Lithonia, Ga.

[73] Assignee: AT&T Bell Laboratories, Murray Hill, N.J.

[21] Appl. No.: 573,596

[22] Filed: Aug. 26, 1990

Related U.S. Application Data

[60] Continuation-in-part of Ser. No. 378,956, Jul. 12, 1989, which is a division of Ser. No. 115,123, Oct. 30, 1987, Pat. No. 4,867,526.

[51] Int. Cl.$^5$ .................... A01G 9/24; A01G 13/02; B32B 27/02; B32B 27/14; B32B 27/20
[52] U.S. Cl. .......................................... 47/28.1; 47/19; 47/31; 428/283; 428/290; 428/296
[58] Field of Search ................ 47/17 M, 19, 28.1, 31; 428/283, 290, 296

[56] References Cited

U.S. PATENT DOCUMENTS

| | | | |
|---|---|---|---|
| 4,603,077 | 7/1986 | Fujimoto et al. | 47/28.1 |
| 4,902,559 | 2/1990 | Eschwey et al. | 428/283 |

*Primary Examiner*—James C. Cannon
*Attorney, Agent, or Firm*—Edward Somers

[57] ABSTRACT

A superabsorbent fabric cover (20) is provided for horticultural uses. The fabric cover includes an absorbent member (25) comprising a substrate which has been impregnated with a superabsorbent material. When the fabric cover is exposed to water the superabsorbent material gels and controls the passage of additional water. Water retained by the cover provides a moist atmosphere or greenhouse effect for plants over which the cover is placed.

12 Claims, 1 Drawing Sheet

5,076,008

HORTICULTURAL FABRIC COVER

CROSS-REFERENCE TO RELATED APPLICATION

This application is a continuation-in-part application of application Ser. No. 07/378,956 which was filed on July 12, 1989 as a divisional application of Ser. No. 07/115,123 which was filed on Oct. 30, 1987 and which issued as U.S. Pat. No. 4,867,526 on Sept. 19, 1989, both of said applications being commonly assigned herewith.

TECHNICAL FIELD

This invention relates to a horticultural fabric cover. More particularly, the invention relates to fabric which may be used, for example, as a cover for growing crops to provide a greenhouse effect thereof.

BACKGROUND OF THE INVENTION

Nonwoven agricultural protective fabrics are used by growers to cover and protect crops, such as vegetables, turf, juvenile citrus trees, ornamental crops, and the like, from the environmental effects of frost, insects, and dessication. Such fabrics protect the crops from such elements during their growth. Nonwoven agricultural protective fabrics must be lightweight, air and water permeable, insulative, able to pass light, and strong enough to avoid tearing as a result of handling and exposure to wind.

The nonwoven protective fabrics of the prior art can balance a grower's requirements for frost protection, light transmission, air and water permeability, desiccation prevention, and strength in order to meet particular needs. The needs of a grower, however, may change during the course of a single growing season. During the early spring when the possibility of frost exists, it is advantageous to use a protective fabric with a high degree of insulation in order to protect young growing plants against freezing. Later in the season, once the risk of frost has ended, it is advantageous to use a protective fabric which has a higher degree of air and water permeability as well as a higher degree of light transmission to assist in the growing process. The goals of frost protection and growth enhancement by a protective fabric result in compromise between the need for insulation versus the need for air and water permeability and light transmission over the entire growing season.

A non-woven material is ideally suited for use as a row cover, which comprises a flexible, translucent covering that is installed over a row of plants to enhance growth and yield. Row covers are placed over the crop at the time of seeding or transplanting. Then, as the crop grows, the row cover is pushed upwardly without causing any damage to the crop.

The two most commonly used nonwovens for agricultural purposes are spunbonded polyester and polypropylene. Also, needlepunched nonwovens have become popular in a number of fields. For example, a relatively new needlepunched root wrap product promotes root growth. This may replace conventional burlap which is so often seen covering roots and associated soil for tree saplings.

A number of manufacturers make protective agricultural fabric. For example, manufactured and sold under the trademark Kimberly Farms is a spunbonded polypropylene fabric. Other agricultural protective fabrics include Linktuf agricultural film manufactured by the Dow Chemical Company, Midland, Mich. Linktuf film is a rib-reinforced low density polyethylene plastic. Other agricultural protective covers include spunbonded polyester manufactured by The Inter Tech Group, North Charleston, S.C., and sold under the trademark Reemay, and a nonwoven polypropylene fabric under the mark Seed Shield sold by Amoco Fabrics and Fiber Co.

In the recently published literature, it has been reported that Reemay spunbonded polyester fabric has been used by vegetable growers and home gardeners. It is lightweight and the plants grow freely underneath and push up the fabric as they grow. The Reemay fabric protects the plants from cold wind, scorching sunlight and insect damage.

As is well known, plants grow well if they are located within a greenhouse. A greenhouse typically provides relatively high humidity and temperatures higher than that outside the protective environment of the greenhouse. Although the hereinbefore described commercially available covers provide a balance between protection and transmission of air and water, none appear to provide a greenhouse effect in which moisture may be retained to aid in the crop's growth while protecting the crops from damage.

What is needed and what seemingly is not provided in the prior art is a horticultural fabric which provides conditions of relatively high humidity for growing crops. Desirably, the sought after horticultural fabric is lightweight and low enough in cost to have potentially attractive markets.

SUMMARY OF THE INVENTION

The foregoing problem of the prior art has been overcome with the horticultural fabric of this invention. A horticultural fabric cover comprises a substrate material which has a relatively high tensile strength and a relatively high porosity. A superabsorbent material impregnates the substrate material to become disposed in cells thereof such that the superabsorbent material gels upon contact with water to retain at least portions of the water and to cause the porosity of the impregnated substrate portion to become sufficiently low to control the passage of additional water therethrough.

The horticultural fabric cover of this invention is relatively porous so that water can penetrate the fabric. However, because the fabric cover is impregnated with the superabsorbent material, upon contact with water, the superabsorbent material gels. As a result, moisture which normally would be lost due to exposure to the sun is retained. Hence, the plants covered by the fabric are surrounded by a canopy of moisture.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
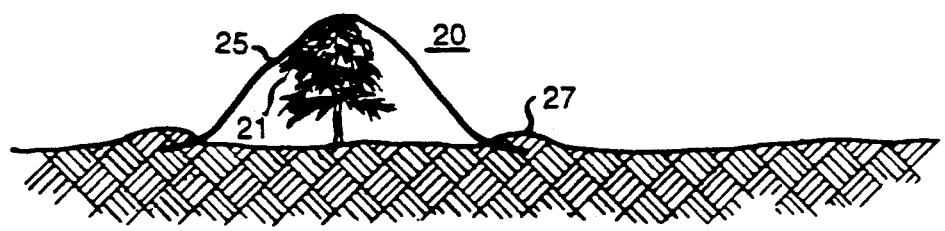
FIG. 1 is an elevational view which depicts growing plants enclosed by a horticultural fabric of this invention.

Referring now to FIG. 1, there is shown a protective fabric cover 20 embodying the present invention. The protective fabric cover 20 is used to cover growing plants 21—21 to protect them from frost, insects and dessication. In addition, the fabric cover 20 allows for the transmission of sunlight to the growing plants, for permeation of air and water, and for retention of moisture to provide a greenhouse effect beneath the canopy formed by the fabric cover to enhance the growth of the plants. The fabric 20 may be supplied to a plant grower in the form of a roll.

The fabric cover 20 is used to cover growing plants to protect them during the early spring from the possibility of frost. Heat is collected under the canopy provided by the fabric cover 20 during the daytime and then retained at night by the insulative nature of the fabric material. As a consequence, the growing plants can be protected from the effects of external frost down to several ambient degrees below freezing as a result of the residual heat retained beneath the insulative fabric cover 20.

Figure 2:
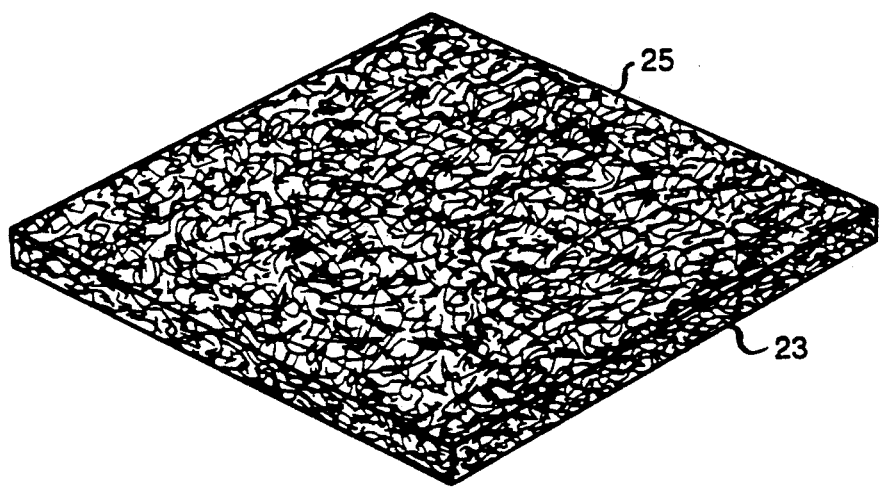
FIG. 2 is a perspective view of a portion of fabric of this invention.

Referring now to FIG. 2, there is shown a perspective view of a portion of superabsorbent fabric material 20 which is used to manufacture the cover 20. The fabric material is liquid absorbent. The absorbent fabric material comprises a substrate or carrier portion 23 which is made of a hydrophobic material and which has been treated with a superabsorbent material. Advantageously, the treated substrate portion which is designated generally by the numeral 25 and which is referred to hereinafter as an absorbent member, is hydrophilic. A hydrophilic material is one that has a strong affinity for water in that it absorbs water easily.

In a preferred embodiment, the substrate portion 23 is a spunbonded non-woven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material, which is substantially nonhygroscopic, and which has the capability of maintaining its shape. The fibers of the web structure are arranged so that air cells or pockets are formed.

A polyethylene terephthalate fiber product, formed into a web structure suitable for the substrate portion 23 as described above, has been identified under the registered trademark "Reemay" by the E. I. du Pont de Nemours and Company, Incorporated of Wilmington, Del. Presently, the Reemay ® web structure is available in various thicknesses and densities from Reemay, Inc. of Old Hickory, Tenn. The properties of Reemay ® tapes are further defined and described in Bulletin R-1, dated March, 1986, entitled "Properties and Processing of Reemay ® Spunbonded Polyester" from E. I. du Pont de Nemours and Company, Incorporated, Wilmington, Del. Stiffness of the material is controlled by a combination of factors such as the number of fibers per unit volume, thickness of the material, size of the fibers and the amount and type of binder used in the material.

Although in a preferred embodiment, a spunbonded polyester substrate portion is used, others also are acceptable. For example, the substrate portion which is to be impregnated be a nylon spunbonded fabric, polypropylene melt blown non-woven fabric, polyurethane spunbonded fabric or TCF cellulose fabric, for example.

At least three factors, formability of the substrate portion 23, cost of the substrate portion, and its superabsorbing geling capability must be considered and balanced in providing the proper material for a particular use. Increasing the thickness of the material obviously increases the cost of the material per unit of surface area.

In a preferred embodiment, the spunbonded polyester substrate portion 23 combines the thermal, chemical, and mechanical properties of polyester fibers with a spunbonded structure to provide a substrate portion which is suitable for use as a crop cover. These properties include a relatively high tensile strength and elongation, and excellent tear strength.

In order to render the absorbent member 25 swellable upon contact with moisture, the substrate portion 23 is impregnated with a suitable water swellable material which herein is referred to as a superabsorbent material.

Superabsorbent materials are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent disclosed saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes-polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

The spunbonded substrate portion 23 may be impregnated with any of several water blocking superabsorbent materials. In a preferred embodiment, it is impregnated with a superabsorbent material which is derived from an aqueous solution comprising acrylate polymeric material which combines acrylic acid and sodium acrylate functionalities and water.

The impregnating material of the preferred embodiment comprises a sodium salt of polyacrylic acid in which all the carboxylic groups may or may not be reacted with sodium. In other words, it is saponified in whole or in part. The level of saponification which may fall within a relatively wide range depends on desired properties. After the substrate portion 23 has been impregnated, the superabsorbent material is dried to provide a film on the substrate portion. It is desirable to impregnate the absorbent member 25 with a film of the impregnating material instead of a powder. The impregnated absorbent member has a density of about 1.1 to 1.8 ounces per square yard which includes the density of the untreated substrate portion increased 10 to 80%, i.e. the add-on, by the treating material.

In another embodiment, a Reemay ® spunbonded polyester material is impregnated with an aqueous solution comprising acrylates and acrylamide polymer powders mixed with water. The material which has been impregnated with such a composition has a density which may represent an increase as high as about 80% of the density of the untreated substrate portion. In each of the embodiments just described, the impregnating material is a mixture of water and a superabsorbent material in which the mixture comprises about 4 to 25% solids when the impregnating material is an aqueous solution and applied.

In general, the substrate portion 23 may be impregnated with (1) a material comprising polyacrylic acid, or (2) a material comprising polyacrylamide or (3) blends of (1) and (2) or salts thereof or (4) copolymers of acrylic acid and acrylamides and salts thereof as well as other similar superabsorbents.

The substrate portion 23 of the absorbent member 25 also possesses specific properties such as porosity and thickness which enhance its use. Of importance is the need for the substrate portion to be made of a material which has a relatively high porosity. It has been found that the liquid absorbing capability increases as the porosity of the substrate portion increases. Porosity may be measured by air permeability in units of cubic feet per minute at a specified water pressure. At 0.5 inch of water pressure, typical porosities are in the range of about 120 to 1000 cfm/min.

The superabsorbent capability of a Reemay ® spunbonded polyester impregnated material is a surprising result. Inasmuch as the Reemay material has a relatively high porosity, it would be expected that liquids would penetrate it rather easily. In at least one catalog which discloses a spunbonded polyester tape having a relatively high porosity, mention is made that such a material has a relatively low moisture pickup, presumably by surface tension. This seemingly would lead one away from its use as a plant cover.

Evidently, because it is so porous and hence substantially cellular in structure, the substrate portion 23 is capable of accepting a substantial quantity of the impregnating material. As a result, entering moisture, in the form of dew or rain, for example, contacts a substantial area of the impregnating material which is liquid absorbing. There is a surprisingly fast reaction between the liquid absorbing material and the entering liquid causing the liquid absorbing impregnating material to swell and retain the moisture as well as to control the passage of additional water therethrough.

The porosity of the treated substrate portion 23 decreases with increasing thickness for a given web structure. In a preferred embodiment, the Reemay ® material is style 2014 which at 0.5 inch of water has a porosity of 800 CFM/ft$^2$. Reemay material marketed under code designation 2014 has a density of 1.0 ounce per square yard, has a thickness of 0.008 inch and is formed of substantially straight polyethylene terephthalate fibers. Reemay material having a code designation of 2024 has a density of 2.1 ounces per square yard, has a thickness of 0.012 inch, has a porosity of 350 CFM/ft$^2$ at 0.5 inch H$_2$O and also is formed of substantially straight polyethylene terephthalate fibers. Reemay material having a code designation of 2415 has a density of 1.15 ounces per square yard, has a thickness of 0.014 inch, has a porosity of 700 CFM/ft$^2$ at 0.5 inch H$_2$O and is formed of crimped polyethylene terephthalate fibers.

Obviously, various other grades and thicknesses of Reemay spunbonded polyester material or other similar materials may be used. Material densities of up to about 2 ounces per square yard are practical values. Practical material thickness may range from 0.005 inch to 0.012 inch thick. These values by no means limit the invention but represent the presently preferred ranges.

Although the porosity of the substrate portion 23 is relatively high, that of the superabsorbent impregnated portion is relatively low. The porosity of the substrate portion 23 must be balanced against other properties. For example, because the portion is to be embodied as a plant cover typically without any other support, it is beneficial for the substrate portion to have a relatively high tensile strength. For a given material width, the tensile strength decreases as the thickness decreases. Although a larger thickness is desired insofar as tensile strength is concerned, a larger thickness may result in less porosity and in a cover which weighs down growing seedlings. Therefore, these two properties must be balanced against each other to arrive at a final thickness. The thickness is established while being mindful of the properties of porosity and tensile strength. The substrate portion 23 must not be too thin, else the tensile strength is affected adversely, and if too thick, the porosity, overall size and weight of the cover are affected adversely. As mentioned hereinbefore, the style 2014 preferred Reemay ® material has a thickness of 0.008 inch which is suitable for use in the cover of this invention.

Reemay fabric is a white, non-woven material which is lightweight (0.6 ounces per square yard), porous to water and transmits 75 to 80% of incident light. Because it is lightweight, supporting hoops are not needed to hold it off plants. It holds in sufficient heat to improve growth, yet is sufficiently porous to allow for self-ventilation. The superabsorbent fabric should not be thought of primarily as a means of frost protection, but primarily as a growth intensifying system which speeds up growth and increases yield. Also, the superabsorbent fabric is effective in increasing daytime air temperatures.

The superabsorbent fabric cover 20 can be applied manually or by mechanical means. The material is rolled out directly over the row of transplanted or direct seeded crops and the edges may be secured with a berm 27 (see FIG. 1) comprising a mound of soil. Also, the Reemay plastic material fabric is applied to provide enough slack for growth of the plants underneath.

Most heat retention and frost protection afforded by covers is due to condensation of moisture on the inside surface of the covers as the temperature falls during nighttime and the dew point is reached inside the covers. Because water is opaque to long wave radiation, the condensation serves as a heat barrier.

The absorbent member 25 also may be used in place of burlap to protect root systems. As such it also functions to prevent root fungus should there be too much rain. The superabsorbent fabric functions to hold moisture in and to enhance growth of plants the roots of which are covered by the absorbent member.

There may be a desired to have the protective crop cover be biodegradable. This may be accomplished by including a starch component in the manufacture of the spunbonded polyester substrate material. Such a cover will degrade with time allowing the protected crops to mature. Biodegradable plastics used as crop covers are discussed, for example, in an article entitled "Recycling Conference Debates Future of Degradable Plastics" which appeared in the September 1988 issue of *Modern Plastics* beginning at page 174.

It is to be understood that the above-described arrangments are simply illustrative of the invention. Other arrangements may be devised by those skilled in the art which will embody the principles of the invention and fall within the spirit and scope thereof.

I claim:

1. A horticultural fabric cover, which comprises:
   a substrate portion comprising a non-laminated, non-woven spunbonded polyester material which has a relatively high tensile strength and a relatively high porosity; and
   a superabsorbent material with which the substrate portion has been impregnated to fill substantially cells thereof such that said superabsorbent material gels upon contact with water to retain at least portions of the water and to cause the porosity of the impregnated substrate portion to become sufficiently low to control the passage of additional water therethrough.

2. The cover of claim 1, wherein said substrate portion has a relatively small thickness and is a spunbonded polyester material which comprises continuous filament polyester fibers that are randomly arranged, highly dispersed and bonded at filament junctions.

3. The cover of claim 1, wherein said substrate portion has been impregnated with a superabsorbent material comprising a mixture which comprises water and a superabsorbent material in which the mixture comprises about 4 to 25% by weight of solids.

4. The cover of claim 3, wherein said superabsorbent material is a film comprising an acrylate polymer which includes acrylic acid and sodium acrylate.

5. The cover of claim 4, wherein the impregnated substrate portion has a unit weight which is equal to about 1.1 to 1.8 ounces per square yard.

6. The cover of claim 3, wherein said substrate portion has a density and the density of the impregnated substrate portion is about 10 to 80% greater than the density of the substrate portion.

7. The cover of claim 3, wherein said superabsorbent material is a film which includes acrylate acrylamide.

8. The cover of claim 1, wherein the relatively high porosity of said substrate portion prior to the impregnation thereof is in the range of about 120 to 1000 cfm at 0.5 inch of water.

9. The cover of claim 1, wherein said substrate portion has a thickness which does not exceed about 0.008 inch and a tensile strength which is at least about 5 lbs/inch of width.

10. The cover of claim 9, wherein said substrate portion, prior to impregnation thereof, has a porosity in the range of about 300 to 1000 cfm at 0.5 inch of water.

11. The cover of claim 1, wherein said superabsorbent material is selected from the group consisting of
    (1) polyacrylic acid;
    (2) polyacrylamide;
    (3) blends of (1) and (2);
    (4) salts of (1) and (2); and
    (5) copolymers of (1) and (2).

12. The cover of claim 1, wherein said substrate portion is characterized as being biodegradable.

* * * * *